(12) United States Patent
Shin et al.

(10) Patent No.: US 9,283,703 B2
(45) Date of Patent: Mar. 15, 2016

(54) TUBULAR INTEGRATED LIGHT EMITTING DIODE (LED) LAMP HOUSING HAVING A HEAT RADIATION SECTION AND A LIGHT TRANSMISSION SECTION AND METHOD FOR MAKING THE SAME

(71) Applicant: Cheil Industries Inc., Gumi-si (KR)

(72) Inventors: Chan Gyun Shin, Uiwang-si (KR); Hoo Seok Lee, Uiwang-si (KR); Nam Hyun Kim, Uiwang-si (KR); Jeong Won Lee, Uiwang-si (KR); Jong Cheol Lim, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 42 days.

(21) Appl. No.: 14/101,891

(22) Filed: Dec. 10, 2013

(65) Prior Publication Data

US 2014/0185279 A1    Jul. 3, 2014

(30) Foreign Application Priority Data

Dec. 31, 2012   (KR) .......................... 10-2012-0158089

(51) Int. Cl.
| | |
|---|---|
| *B29C 45/16* | (2006.01) |
| *F21V 25/12* | (2006.01) |
| *F21K 99/00* | (2010.01) |
| *F21S 4/00* | (2006.01) |
| *F21V 3/04* | (2006.01) |
| *F21V 15/01* | (2006.01) |
| *B29C 47/00* | (2006.01) |
| *B29C 47/06* | (2006.01) |
| *F21V 29/87* | (2015.01) |
| *F21Y 101/02* | (2006.01) |

(52) U.S. Cl.
CPC ............ *B29C 45/164* (2013.01); *B29C 47/0023* (2013.01); *B29C 47/065* (2013.01); *F21K 9/10* (2013.01); *F21K 9/90* (2013.01); *F21S 4/003* (2013.01); *F21V 3/0436* (2013.01); *F21V 15/013* (2013.01); *F21V 25/12* (2013.01); *F21V 29/87* (2015.01); *F21Y 2101/02* (2013.01)

(58) Field of Classification Search
CPC ..... F21V 29/87; F21V 29/244; F21V 3/0436; F21V 15/013; F21V 25/12; B29C 45/164; B29C 47/065; B29C 47/0023; F21K 9/10; F21K 9/90; F21S 4/003; F21Y 2101/02
USPC ........................................................ 362/218
See application file for complete search history.

(56) References Cited

U.S. PATENT DOCUMENTS

| | | | | |
|---|---|---|---|---|
| 7,267,461 | B2 * | 9/2007 | Kan et al. ....................... | 362/373 |
| 8,272,764 | B2 * | 9/2012 | Son ............................... | 362/294 |
| 2004/0252502 | A1 * | 12/2004 | McCullough et al. ......... | 362/241 |
| 2007/0213452 | A1 * | 9/2007 | Kawato et al. ................. | 524/502 |
| 2008/0073624 | A1 * | 3/2008 | Choi et al. ..................... | 252/582 |
| 2009/0290334 | A1 * | 11/2009 | Ivey et al. ...................... | 362/219 |
| 2012/0014087 | A1 * | 1/2012 | Wang et al. .................... | 362/84 |

FOREIGN PATENT DOCUMENTS

| | | | |
|---|---|---|---|
| EP | 1 361 252 B1 | * | 6/2006 |
| JP | 2010214628 A | * | 9/2010 |

* cited by examiner

*Primary Examiner* — Mary Ellen Bowman
(74) *Attorney, Agent, or Firm* — Additon, Higgins & Pendleton, P.A.

(57) ABSTRACT

An integrated LED lamp housing can include a heat radiation section and a light transmission section. The integrated LED lamp housing can be prepared by co-extruding different polycarbonate resin compositions.

10 Claims, 2 Drawing Sheets

| | structure | | process |
|---|---|---|---|
| integral type | ○ | | coextrusion |
| seperate type | ⌒ + ⌣ | | extrusion + assembly |

(a) (b)

TUBULAR INTEGRATED LIGHT EMITTING DIODE (LED) LAMP HOUSING HAVING A HEAT RADIATION SECTION AND A LIGHT TRANSMISSION SECTION AND METHOD FOR MAKING THE SAME

CROSS-REFERENCE TO RELATED APPLICATION

This application claims priority under 35 USC Section 119 to and the benefit of Korean Patent Application No. 10-2012-0158089, filed Dec. 31, 2012, the entire disclosure of which is incorporated herein by reference.

FIELD OF THE INVENTION

The present invention relates to a LED lamp housing. More particularly, the present invention relates to an integrated LED lamp housing including a heat radiation section and a light transmission section, which is prepared by co-extruding different polycarbonate resin compositions.

BACKGROUND OF THE INVENTION

Light emitting diodes (LEDs) consume less power and can have a long life, and thus the demand for LEDs has steadily increased as eco-friendly products. LEDs have been used in various electronic products and recently have been used as a light source for tubular fluorescent lights for home lamps.

When a LED is used as the light source of a lamp, heat generated from the LED should be effectively transferred to the exterior of the lamp because the LED diffuses a large amount of heat.

FIG. 1 illustrates a traditional general tubular LED lamp. The housing of the lamp can be prepared by assembling a hemispherical heat radiation section and a hemispherical light transmission section, and a LED device and power supply, respectively, can be installed as the light source inside the housing.

Generally, the heat radiation section of the LED lamp housing may be prepared by die-casting a metal material having excellent heat conductivity, such as aluminum. However, there can be problems associated with this process, such as high manufacturing costs and low productivity.

In addition, if the heat radiation section is prepared with metal materials, the weight of LED lamp can increase due to the weight of the metal materials. This can render the LED lamp unsuitable as a home lamp.

The heat radiation section and the light transmission section can also be assembled by mechanical fastening methods. This, however, can increase the likelihood of LED lamp malfunction due to penetration of moisture or/and water through the crack between connections.

In addition, the heat radiation section and the light transmission section can be separately prepared and then assembled by a mechanical fastening method. This, however, reduce efficiency.

Thus, there is increased interest in heat conductive resin compositions which can replace metal materials used for traditional heat radiation sections.

It is generally known that heat can be transferred over a sort of acoustic particles called phonons. Phonons can be transferred through a medium having a crystalline structure because the phonon has properties of a sound wave. Thus, in a heat conductive resin composition, phonons may be easily and quickly transferred through heat conductive filler with a crystalline lattice. In contrast, it can be difficult for phonons to transfer through a polymer resin which has a low degree of crystallization and low heat conductivity. Also scattering can occur due to the phonons having the properties of a sound wave, so a significant amount of phonons can be lost at the interface of heat conductive filler and polymer resin. Thus, in the case of conventional heat conductive resin compositions, heat may not be easily transferred through the polymer resin having low heat conductivity, and the ease and/or rate of heat transfer can depend on the heat conductive filler having high heat conductivity.

Examples of a heat conductive filler impregnated with the heat conductive resin composition can include carbon fillers such as carbon fibers, carbon nanotubes, carbon nanofibers, graphite, and the like, and metal powders.

A heat conductive resin composition comprising carbon fillers and metal powders can exhibit electrical conductivity because the carbon fillers and metal powders can have not only high heat conductivity but also high electrical conductivity. Thus, carbon fillers and metal powders can be difficult to use in products requiring insulating properties in addition to high heat conductivity, such as a heat radiation section of a LED lamp housing.

Ceramic fillers can be used as heat conductive insulating fillers which do not conduct electricity. Because ceramic fillers have low heat conductivity, however, large amounts of ceramic fillers are typically required to prepare an insulating resin composition having high heat conductivity. If the amount of filler is increased, however, the viscosity of the resin composition can be high, which can deteriorate extrusion moldability and injection processablity. Thus it can be difficult to prepare a product using a resin composition including ceramic fillers. Also, mechanical strength of the product can be deteriorated.

Therefore, in order to prepare a heat conductive insulating resin composition having heat conductivity, electrical insulation and excellent mechanical properties, an electrical insulating filler should be used in as small amount as possible, and an effective heat conduction network between heat conductive insulation fillers should be formed.

SUMMARY OF THE INVENTION

To solve these problems, the present inventors have developed an integrated LED lamp housing including a heat radiation section and a light transmission section, which is prepared by co-extruding different polycarbonate resin compositions. The LED lamp housing can have excellent adhesion between the heat radiation section and the light transmission section. The LED lamp can also have excellent heat conductivity. The LED lamp housing can also exhibit excellent moisture-proof and/or water-proof properties. The LED lamp housing further can include a heat radiation section having excellent heat conductivity. The LED lamp housing can also have good process efficiency and economic value.

A LED lamp housing of the present invention comprises a heat radiation section comprising a heat conductive polycarbonate resin composition and a light transmission section comprising transparent polycarbonate resin composition.

The heat radiation section and the light transmission section can be molded into an integral form or structure.

The heat radiation section and the light transmission section can be prepared by co-extruding a heat conductive polycarbonate resin composition and a transparent polycarbonate resin composition.

The LED lamp housing of the present invention can be tubular type.

The heat conductive polycarbonate resin composition of the LED lamp housing of the present invention can comprise (A) about 30 to about 80% by weight of a polycarbonate resin and (B) about 20 to about 70% by weight of magnesium oxide (minute) particles.

The magnesium oxide particles (B) can be spherical particles and can have an average diameter of about 30 to about 80 μm.

The transparent polycarbonate resin composition of the LED lamp housing of the present invention can comprise (A) about 100 parts by weight of a polycarbonate resin composition and (C) about 0.1 to about 2 parts by weight of a light-diffusing agent.

The heat conductive polycarbonate resin composition and the transparent polycarbonate resin composition of the LED lamp housing of the present invention each can independently further comprise (D) a flame retardant. The flame retardant (D) can include a fluorinated polyolefin resin, sulfonic acid metal salt compound, or combination thereof.

The heat radiation section of the LED lamp housing of the of the present invention can have a heat conductivity of about 0.5 W/mK or more in the horizontal direction with respect to the molding direction, and can have a heat conductivity of about 0.4 W/mK or more in the vertical direction with respect to the molding direction measured in accordance with ASTM E1461.

Examples of the light-diffusing agent (C) of the present invention can comprise acrylic light-diffusing agents (C1), silicon light-diffusing agents (C2), or a combination of thereof.

The silicon light-diffusing agent (C2) can comprise about 50 to about 100% by weight of polyorgano silsesquioxane based on total amount of the silicon light-diffusing agent.

The LED lamp housing can be prepared by a method comprising the steps of directing a heat conductive polycarbonate resin composition into a first insertion hole (first inlet port) of a co-extruder which comprises a first extruder having the first insertion hole (first inlet port) and a second extruder having a second insertion hole (second inlet port); directing a transparent polycarbonate resin composition into the second insertion hole (second inlet port); melting/mixing the heat conductive polycarbonate resin composition and the transparent polycarbonate resin composition within the heated first extruder and the heated second extruder, respectively; directing the melted/mixed heat conductive polycarbonate resin composition from the first extruder into a side of a die having a heat radiation section form and directing the melted/mixed transparent polycarbonate resin composition from the second extruder into another side of the die having a light transmission section form; and molding the respective melted/mixed resin compositions into an integral form within the die by binding (adhering) the heat radiation section and the light transmission section to one another.

The heat conductive polycarbonate resin composition can comprise (A) about 30 to about 80% by weight of a polycarbonate resin, and (B) about 20 to about 70% by weight of magnesium oxide (minute) particles.

The transparent polycarbonate resin composition can comprise (A) about 100 parts by weight of a polycarbonate resin, and (C) about 0.1 to about 2 parts by weight of a light-diffusing agent.

The present invention can provide a LED lamp housing comprising a heat radiation section and a light transmission section, wherein the heat radiation section and the light transmission section can be molded into an integral form by co-extruding different polycarbonate resin compositions. The LED lamp housing can have good adhesion between the heat radiation section and the light transmission section, excellent moisture-proof properties, excellent water-proof properties, excellent heat conductivity of the heat radiation section, good process efficiency and excellent economic value.

DETAILED DESCRIPTION OF THE INVENTION

The present invention now will be described more fully hereinafter in the following detailed description of the invention in which some but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention relates to a LED lamp housing. More particularly, the present invention relates to an integrated LED lamp housing including a heat radiation section and a light transmission section, which is prepared by co-extruding different polycarbonate resin compositions.

The LED lamp housing of the present invention comprises the heat radiation section comprising a heat conductive polycarbonate resin and the light transmission section comprising a transparent polycarbonate resin composition. The heat radiation section and the light transmission section can be integrally molded by co-extruding a heat conductive polycarbonate resin composition and a transparent polycarbonate resin composition. The LED lamp housing of the present invention may be a tubular LED lamp housing.

Figures 1, 2:
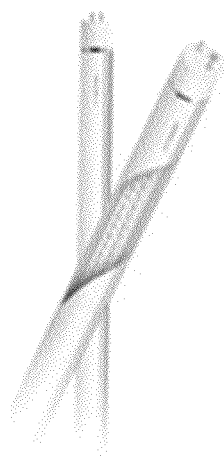
FIG. 1 is a diagram of a traditional tubular LED lamp.
FIG. 2 is a diagram comparing a tubular LED lamp housing which is co-extruded in accordance with the present invention and a tubular LED lamp housing which is assembled in accordance with a traditional mechanical fastening.
Figure 3:
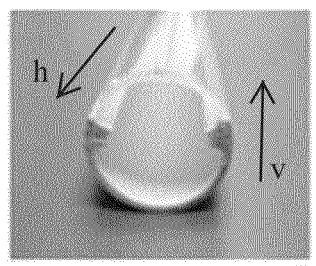
FIG. 3(a) is a cross-sectional diagram of an exemplary LED lamp housing of the present invention.
FIG. 3(b) is an oblique view of an exemplary LED lamp housing of the present invention.
Figure 3:
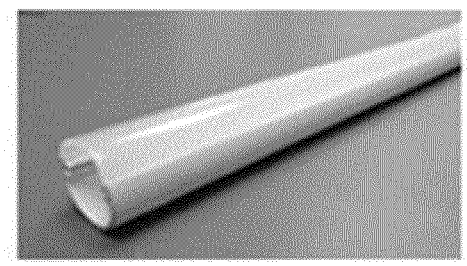

The LED lamp housing of the present invention may comprise the heat radiation section and the light transmission section. FIG. 3(a) is a cross-sectional view of an exemplary LED lamp housing of the present invention, and FIG. 3(b) is an oblique view of an exemplary LED lamp housing of the present invention. The LED lamp housing of the present invention can be molded into an integral form by co-extruding the heat radiation section and the light transmission section. The light transmission section may be made using a transparent polycarbonate resin composition to transmit and also diffuse light from the light source of the LED lamp. The heat radiation section may be made using a heat conductive polycarbonate resin composition in order to effectively transfer generated heat away from a LED device, for example, to the exterior of the lamp.

In the present invention, the heat conductive polycarbonate resin composition of the heat radiation section may comprise magnesium oxide (minute) particles as heat conductive insulating filler so that the heat radiation section can exhibit heat conductivity. Also in the present invention, the transparent polycarbonate resin composition of the light transmission section may comprise an acrylic light-diffusing agent and/or silicon light-diffusing agent as a light-diffusing agent so that the light transmission section can exhibit light transmissive property and light diffusible property.

In the present invention, the heat radiation section and the light transmission section may be integrally molded by co-extruding. To prepare the integrated LED lamp housing by co-extruding, the adhesive property between the transparent polycarbonate resin composition of light transmission section and the heat conductive polycarbonate resin composition of the heat radiation section should be good. Sufficient adhesive property between the heat radiation section and light transmission section can be obtained by using polycarbonate resin in both the heat radiation section and the light transmission section.

Below, each of the light transmission section and the heat radiation section of the LED lamp housing is described in more detail.

Composition of the Heat Radiation Section: Heat Conductive Polycarbonate Resin Composition In the present invention, the heat radiation section can comprise a heat conductive polycarbonate resin composition.

(A) Polycarbonate (PC) Resin

Generally, a base resin of a heat conductive resin composition may include polyphenylene sulfide resin or polyamide resin. In the present invention, however, the same kind of polycarbonate resin which is used in the transparent thermoplastic resin composition of the light transmission section may be used. Using the same kind of polycarbonate resin can improve bonding between (adhesion of) the heat radiation section and the light transmission section.

In the present invention, the polycarbonate resin can be prepared by reacting one or more diphenols represented by the following Chemical Formula 1 with one or more compounds comprising phosgene, halogen formate, carbonate, or a combination thereof.

[Chemical Formula 1]

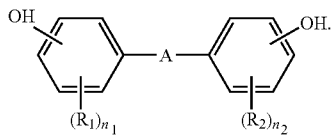

In Chemical Formula 1,

A is single bond, a linker comprising substituted or unsubstituted C1 to C5 alkylene, substituted or unsubstituted C2 to C5 alkylidene, substituted or unsubstituted C5 to C6 cycloalkylene, substituted or unsubstituted C5 to C10 cycloalkylidene, CO, S, or $SO_2$, each $R_1$ and $R_2$ can be the same or different and each can be independently substituted or unsubstituted C1 to C30 alkyl or substituted or unsubstituted C6 to C30 aryl, and each $n_1$ and $n_2$ can be the same or different and each can be independently an integer of 0 to 4.

As used herein, the term "substituted" means that one or more hydrogen atoms are substituted with halogen, C1 to C30 alkyl, C1 to C30 haloalkyl, C6 to C30 aryl, C1 to C20 alkoxy, or a combination thereof.

The polycarbonate resin can include one diphenol or can include two or more diphenols represented by Chemical Formula 1 above.

Examples of diphenol can include without limitation 4,4'-dihydroxydiphenyl, 2,2-bis-(4-hydroxyphenyl)-propane (also called 'bisphenol-A'), 2,4-bis-(4-hydroxyphenyl)-2-methyl butane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like, and combinations thereof. In exemplary embodiments, 2,2-bis-(4-hydroxyphenyl)-propane, 2,2-bis-(3,5-dichloro-4-hydroxyphenyl)-propane, and/or 1,1-bis-(4-hydroxyphenyl)-cyclohexane can be used, for example, 2,2-bis-(4-hydroxyphenyl)-propane can be used.

The polycarbonate resin can have a weight-average molecular weight of about 10,000 to about 200,000 g/mol, for example, about 15,000 to about 80,000 g/mol. When the polycarbonate resin has a weight average molecular weight within the above range, the polycarbonate resin composition can exhibit excellent impact strength and can have good processability due to having suitable fluidity.

The polycarbonate resin may be a copolymer or a combination of copolymers prepared from two or more different diphenols. Other examples of the polycarbonate resin can include without limitation linear polycarbonate resins, branched polycarbonate resins, polyester-carbonate copolymer resins, polycarbonate-siloxane copolymer resins, and the like, and combinations thereof.

Examples of the linear polycarbonate resin can include bisphenol-A polycarbonate resin, and the like. The branched polycarbonate resin can be prepared by reacting a multifunctional aromatic compound, such as trimellitic anhydride and/or trimellitic acid, with diphenol and carbonate. The amount of the multifunctional aromatic compound may be about 0.05 to about 2 mol % based on the total amount of branched polycarbonate resin. The polyester-carbonate copolymer resin can be prepared by reacting bifunctional carboxylic acid with diphenol and carbonate. Examples of the carbonate can include diaryl carbonate, such as diphenyl carbonate, cyclic ethylene carbonate, and the like.

The heat conductive polycarbonate resin composition can include the polycarbonate resin in an amount of about 30 to about 80% by weight, based on the total weight (100% by weight) of the heat conductive polycarbonate resin composition including polycarbonate resin and magnesium oxide (minute) particles. In some embodiments, the heat conductive polycarbonate resin composition can include the polycarbonate resin in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight. Further, according to some embodiments of the present invention, the polycarbonate resin may be present in an amount of from about any of the foregoing amounts to about any other of the foregoing amounts.

When the heat conductive polycarbonate resin composition includes the polycarbonate resin in an amount within the above range, the adhesive property between the heat radiation section and the light transmission section can be excellent, and suitable fluidity and viscosity can be secured, so that processability can be secured when the resin compositions are co-extruded.

(B) Magnesium Oxide (MgO) (Minute) Particles

In the present invention, the heat conductive polycarbonate resin composition used in the heat radiation section can include magnesium oxide (minute) particles as heat conductive insulating filler in order to effectively transfer generated heat away from a light source, for example to the outside of the lamp.

In view of both thermal diffusivity and fluidity of the heat conductive polycarbonate resin composition comprising the magnesium oxide (minute) particles, the magnesium oxide (minute) particles should include spherical particles. The spherical magnesium oxide (minute) particles can have electric insulating property and also can have excellent heat conductivity not only in horizontal direction with respect to the molding direction of the resin composition but also in the vertical direction with respect to the molding direction. Accordingly regardless of direction the resin composition can have excellent heat conductivity.

In the present invention, the spherical magnesium oxide (minute) particles can have an average diameter of about 30 to about 80 µm, for example about 40 to about 60 µm. In some embodiments, the spherical magnesium oxide (minute) particles can have an average diameter of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 µm. Further, according to some embodiments of the present invention, the spherical magnesium oxide (minute) particles can have an average diameter from about any of the foregoing amounts to about any other of the foregoing amounts.

When the spherical magnesium oxide (minute) particles have an average diameter within the above range, the heat conductive polycarbonate resin composition can have a good balance of fluidity with other material properties In order to prepare the heat radiation section with the insulating resin composition having high heat conductivity, the amount of magnesium oxide particles can be increased. If the amount of filler is increased, however, the viscosity of the resin composition can be high, and extrusion moldability and injection moldability can be deteriorated, and further mechanical strength can be deteriorated.

Accordingly, the heat conductive polycarbonate resin composition can include the magnesium oxide (minute) particles in an amount of about 20 to about 70% by weight, based on the total weight (100% by weight) of the heat conductive polycarbonate resin composition including the polycarbonate resin and magnesium oxide (minute) particles. In some embodiments, the heat conductive polycarbonate resin composition can include the magnesium oxide (minute) particles in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70% by weight. Further, according to some embodiments of the present invention, the magnesium oxide (minute) particles may be present in an amount of from about any of the foregoing amounts to about any other of the foregoing amounts.

When the heat conductive polycarbonate resin composition includes the magnesium oxide (minute) particles in an amount within the above range, the heat radiation section which is prepared from the heat conductive polycarbonate resin composition can exhibit good moldability when co-extruded due to having excellent adhesive property with the light transmission section, suitable fluidity and viscosity.

Composition of the Light Transmission Section: Transparent Polycarbonate Resin Composition In the present invention, the light transmission section can comprise a transparent polycarbonate resin composition.

(A) Polycarbonate (PC) Resin

Polycarbonate resin is suitable for use as the light transmission section of the LED lamp housing because it can inherently have good transparency and impact strength.

The types of polycarbonate resin that can be used in the transparent polycarbonate resin composition of the present invention are the same as the polycarbonate resins described herein for use in the heat conductive polycarbonate resin composition.

(C) Light-Diffusing Agent

In the present invention, in order to increase both light transmissive (transmission) property and light diffusible (diffusion) property of the light transmission section, the transparent polycarbonate resin composition can comprise a light-diffusing agent. Examples of the light-diffusing agent can include without limitation acrylic light-diffusing agents (C1), silicon light-diffusing agents (C2), and the like, and combinations thereof.

(C1) Acrylic Light-Diffusing Agent

An acrylic light-diffusing agent can be used to increase the light transmissive (transmission) property and light diffusible (diffusion) property of the transparent polycarbonate resin composition which is used in the light transmission section.

Examples of the acrylic light-diffusing agent may include without limitation polymers of a (meth)acrylate monomer, copolymers of (meth)acrylate monomers, and the like, and combinations thereof.

The acrylic light-diffusing agent may have a linear structure, a weight-average molecular weight of about 5,000 to about 300,000 g/mol, and a refractive index of about 1.480 to about 1.495.

Examples of the (meth)acrylate monomers can include, without limitation, methyl methacrylate, ethyl methacrylate, n-propyl methacrylate, n-butyl methacrylate, hexyl methacrylate, cyclohexyl methacrylate, phenyl methacrylate, benzyl methacrylate, phenoxy methacrylate, phenoxyethyl methacrylate, methyl acrylate, ethyl acrylate, propyl acrylate, butyl acrylate, 2-ethylhexyl acrylate, 2-ethylhexyl methacrylate, and the like. The (meth)acrylate monomers can be used alone or as combinations of at least two.

The acrylic light-diffusing agent can be prepared using conventional methods, such as bulk polymerization, emulsion polymerization, and/or suspension polymerization. These methods are well known to the skilled artisan.

The transparent polycarbonate resin composition can include the acrylic light-diffusing agent an amount of about 0.1 to about 2 parts by weight, based on about 100 parts by weight of the polycarbonate resin of the transparent polycarbonate resin composition. In some embodiments, the transparent polycarbonate resin composition can include the acrylic light-diffusing agent in an amount of about 0.1, 0.2, 0.3, 0.4, 0.5, 0.6, 0.7, 0.8, 0.9, 1, or 2 parts by weight. Further, according to some embodiments of the present invention, the acrylic light-diffusing agent may be present in an amount of from about any of the foregoing amounts to about any other of the foregoing amounts.

When the transparent polycarbonate resin composition includes the acrylic light-diffusing agent in an amount within the above range, the transparent polycarbonate resin composition can have excellent light transmission property and light diffusion property, and can maintain excellent impact strength.

(C2) Silicon Light-Diffusing Agent

The silicon light-diffusing agent can be used to increase both light transmissive (transmission) property and light diffusible (diffusion) property of the transparent polycarbonate resin composition which is used in the light transmission section of the present invention.

The silicon light-diffusing agent can comprise inorganic (minute) particles, and can comprise polyorganosilsesquioxane as a main component. The silicon light-diffusing agent can include the polyorganosilsesquioxane in an amount of about 50 to about 100% by weight based on the total weight (100% by weight) of the silicon light-diffusing agent. In some embodiments, the silicon light-diffusing agent can include the polyorganosilsesquioxane in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100% by weight. Further, according to some embodiments of the present invention, the polyorganosilsesquioxane may be present in an amount of from about any of the foregoing amounts to about any other of the foregoing amounts.

Examples of polyorganosilsesquioxane can include without limitation polymethylsilsesquioxane, polyethylsilsesquioxane, polypropylsilsesquioxane, polybutylsilsesquioxane, and the like, and combinations thereof. For example, polymethylsilsesquioxane can be used.

The transparent polycarbonate resin composition can include the silicon light-diffusing agent in an amount of about 0.1 to about 2 parts by weight, based on about 100 parts by weight of the polycarbonate resin of the transparent polycarbonate resin composition. In some embodiments, the transparent polycarbonate resin composition can include the silicon light-diffusing agent in an amount of about 0.1, 0.2, 0.3, 0.4, 0.5, 0.6, 0.7, 0.8, 0.9, 1, or 2 parts by weight. Further, according to some embodiments of the present invention, the silicon light-diffusing agent may be present in an amount of from about any of the foregoing amounts to about any other of the foregoing amounts.

When the transparent polycarbonate resin composition includes the silicon light-diffusing agent in an amount within the above range, the transparent polycarbonate resin composition can have light transmissive property and light diffusible property, and can maintain excellent impact strength.

(D) Flame Retardant

Each the heat conductive polycarbonate resin composition and the transparent polycarbonate resin composition, which are used in the heat radiation section and the light transmission section, respectively, of the LED lamp housing of the present invention, can optionally further comprise flame retardant in order to improve flame retardancy. Known flame retardants can be used without limitation. In exemplary embodiments, fluorinated polyolefin resin, sulfonic acid metal salt compound, or a combination thereof may be used.

Examples of the fluorinated polyolefin resin can include without limitation polytetrafluoroethylene, polyvinylidene fluororide, tetrafluoroethylene/vinylidene fluororide copolymer, tetrafluoroethylene/hexafluoroethylene copolymer, ethylene/tetrafluoroethylene copolymer, and the like. They may be used singly or as a combination of two or more. For example, polytetrafluoroethylene can be used.

Examples of sulfonic acid metal salt compounds can include without limitation sulfonic acid metal salts, aliphatic sulfonic acid metal salts, and the like, and combinations thereof. For example, potassium perfluorobutane sulfonic acid can be used.

In the case of the heat conductive polycarbonate resin composition, in order to prevent deterioration of mechanical properties of the heat conductive polycarbonate resin and to provide adhesion between the heat radiation section and the light transmission section, the heat conductive polycarbonate resin composition can include the flame retardant in an amount of about 0.05 to about 3 parts by weight, based on about 100 parts by weight of the polycarbonate resin and the magnesium oxide (minute) particles. In some embodiments, the heat conductive polycarbonate resin composition can include the flame retardant in an amount of about 0.05, 0.06, 0.07, 0.08, 0.09, 0.1, 0.2, 0.3, 0.4, 0.5, 0.6, 0.7, 0.8, 0.9, 1, 2, or 3 parts by weight. Further, according to some embodiments of the present invention, the flame retardant may be present in an amount of from about any of the foregoing amounts to about any other of the foregoing amounts.

In the case of the transparent polycarbonate resin composition, in order to prevent deterioration of light transmissive property, light diffusible property and mechanical property of the transparent polycarbonate resin composition and to provide adhesion between the heat radiation section and the light transmission section, the transparent polycarbonate resin composition can include the flame retardant in an amount of about 0.05 to about 3 parts by weight, based on about 100 parts by weight of polycarbonate resin. In some embodiments, the transparent polycarbonate resin composition can include the flame retardant in an amount of about 0.05, 0.06, 0.07, 0.08, 0.09, 0.1, 0.2, 0.3, 0.4, 0.5, 0.6, 0.7, 0.8, 0.9, 1, 2, or 3 parts by weight. Further, according to some embodiments of the present invention, the flame retardant may be present in an amount of from about any of the foregoing amounts to about any other of the foregoing amounts.

(E) Other Additives

In order to increase physical properties while maintaining heat conductivity, light transmissive (transmission) property and light diffusible (diffusion) property, the polycarbonate resin compositions used in the heat radiation section and the light transmission section, respectively, of the LED lamp housing of the present invention, can optionally further comprise one or more additional additives. Examples of the additives can include without limitation antioxidants, lubricants, flame retardants, thermal stabilizers, inorganic additives, pigments, dyes, and the like, and combinations thereof.

The heat conductive polycarbonate resin composition can include the additive(s) in an amount of about 0.1 to about 5 parts by weight, based on about 100 parts by weight of the polycarbonate resin and the magnesium oxide (minute) particles. The transparent polycarbonate resin composition can include the additive(s) in an amount of about 0.1 to about 5 parts by weight based on about 100 parts by weight of the polycarbonate resin.

The heat radiation section which is prepared from the heat conductive polycarbonate resin composition can have a heat conductivity of about 0.5 W/mK or more in the horizontal direction with respect to the molding direction, and can have a heat conductivity of about 0.4 W/mK or more in the vertical direction with respect to the molding direction, each of which is measured in accordance with ASTM E1461.

According to one embodiment of the present invention, in order to improve the heat radiation effect by increasing surface area, known technologies for increasing surface area, such as forming a radiation fin on internal side or external side of the heat radiation section, or forming a groove can be used. The present invention can provide a tubular LED lamp which can be prepared by positioning a LED device along an internal side of a LED lamp housing, and by combining a base which is installed contact pin in both terminal of the housing.

A Method for Preparing LED Lamp Housing

According to one embodiment, the LED lamp housing can be prepared by a method comprising the steps of: directing a heat conductive polycarbonate resin composition into a first insertion hole (first inlet port) of a co-extruder which comprises a first extruder having the first insertion hole (first inlet port) and a second extruder having a second insertion hole (second inlet port), directing a transparent polycarbonate resin composition into the second insertion hole (second inlet port), melting/mixing the heat conductive polycarbonate resin composition in the heated first extruder and melting/mixing the transparent polycarbonate resin composition in the heated second extruder, directing the melted/mixed heat conductive polycarbonate resin composition from the first extruder into one side of a die having a heat radiation section form, directing the melted/mixed transparent polycarbonate resin composition from the second extruder into another side of the die having a light transmission section form, and molding the respective melted/mixed resin compositions into an integral (single) form within the die by binding (adhering) the heat radiation section and the light transmission section to one another to form an integrated LED lamp housing.

The present invention will be further defined in the following Examples, which are intended for the purpose of illustration and are not to be construed as in any way limiting the scope of the present invention.

EXAMPLES

The particulars of each component used in the Examples and Comparative Examples are as follows:

(A) Polycarbonate (PC) Resin

Polycarbonate (Product name: SC-1080) manufactured by Cheil Industries Inc. is used.

(A') Polyphenylene Sulfide (PPS) Resin

Polyphenylene sulfide (Product name: PPS-hb DL) manufactured by Deokyang of China is used.

(A") Polyamide (PA) Resin

Polyamide resin (Product name: Leona-1200) manufactured by Asahi Kasei Chemicals of Japan is used.

(B) Magnesium Oxide (MgO) (Minute) Particles

Spherical magnesium oxide (minute) particles having an average diameter of 50 μm are used.

(B') Aluminum Oxide ($Al_2O_3$) (Minute) Particles

Spherical aluminum oxide (minute) particles having an average diameter of 50 μm manufactured by Denka of Japan are used.

(C) Silicon Light-Diffusing Agent

A silicon light-diffusing agent comprising 80% by weight of polyorganosilsesquioxane is used.

(D) Flame Retardant (D1) Sulfonic Acid Metal Salt Compound

Potassium perfluorobutane sulfonic acid (KPBS) is used.

(D2) Fluorinated Polyolefin Resin

Polytetrafluoroethylene (PTFE) resin (Product name: MM5935 EF) manufactured by 3M is used.

Evaluation Methods for Physical Properties (1) Heat conductivity (W/mK) is measured in accordance with ASTM E1461.

(2) Flame resistance (flammability: UL94) is measured for a 1.5 mm thick specimen in accordance with UL 94.

(3) Adhesive property (grade of appearance): Appearances of ten integrated LED lamp housing articles integrally formed by co-extruding a heat radiation section and light transmission section are respectively evaluated with naked eye, and an average is calculated after grading in accordance with following standard:

very good: 5~4, good: 3, normal: 2, poor: 1, very poor: 0

Examples 1 to 6 and Comparative Examples 1 to 5

The components in the amounts set forth in the following Table 1 are placed into a biaxial melting extruder which is heated to 240 to 350° C., and then a heat conductive resin composition for preparing a heat radiation section, and a transparent resin composition for preparing a light transmission section are prepared in the form of pellets by a melting/mixing process. The pellets are dried at 100 to 130° C. for 5 hours or more, and then specimens for physical property evaluation are prepared using screw-type injection machine heated to 240 to 330° C.

To prepare co-extruded articles in which a heat radiation section and a light transmission section are integrally formed, the heat conductive resin composition for the heat radiation section and the transparent resin composition for the light transmission section are respectively prepared.

The heat conductive polycarbonate resin composition pellets are directed into a first insertion hole (first inlet port) of a co-extruder which comprises a first extruder having the first insertion hole and a second extruder having a second insertion hole (second inlet port), and then the transparent polycarbonate resin composition pellets are directed into the second insertion hole. The heat conductive polycarbonate resin composition and the transparent polycarbonate resin composition are melted/mixed within the first extruder and the second extruder, respectively, wherein each extruder is heated at 240 to 350° C. Then, the melted/mixed heat conductive polycarbonate resin composition is directed from the first extruder into one side of a die having a heat radiation section form, and the melted/mixed transparent polycarbonate resin composition is directed from the second extruder into another side of the die having a light transmission section form. Finally, an integrated LED lamp housing article which includes a heat radiation section integrally molded with a light transmission section is prepared by bonding and integrally molding the same in the die.

In the following Table 1, the amounts of (A) and (B) are represented as % by weight based on 100% by weight of (A) and (B), and the amount of (C) is represented as parts by weight based on 100 parts by weight of (A). Also the amounts of (D1) and (D2) are represented as parts by weight based on 100 parts by weight of (A) and (B). The basis for the amounts of (A') and (A") is same as for (A), and the basis for the amount of (B') is same as for (B).

|  |  | Examples |  |  |  |  |  | Comparative Examples |  |  |  |  |
|---|---|---|---|---|---|---|---|---|---|---|---|---|
| Components |  | 1 | 2 | 3 | 4 | 5 | 6 | 1 | 2 | 3 | 4 | 5 |
| Heat radiation section | (A) PC resin | 80 | 70 | 60 | 50 | 40 | 30 | 60 | — | — | — | — |
|  | (A') PPS resin | — | — | — | — | — | — | — | 60 | 60 | — | — |
|  | (A") PA resin | — | — | — | — | — | — | — | — | — | 60 | 60 |
|  | (B) MgO (minute) particles | 20 | 30 | 40 | 50 | 60 | 70 | — | 40 | — | 40 | — |
|  | (B') $Al_2O_3$ (minute) particles | — | — | — | — | — | — | 40 | — | 40 | — | 40 |
|  | (D1) KPBS flame retardant | 0.1 | 0.1 | 0.1 | 0.1 | 0.1 | 0.1 | 0.1 | — | — | — | — |
|  | (D2) PTFE | 0.4 | 0.4 | 0.4 | 0.4 | 0.4 | 0.4 | 0.4 | 0.4 | 0.4 | 0.4 | 0.4 |

-continued

| | Components | Examples | | | | | | Comparative Examples | | | | |
|---|---|---|---|---|---|---|---|---|---|---|---|---|
| | | 1 | 2 | 3 | 4 | 5 | 6 | 1 | 2 | 3 | 4 | 5 |
| Light transmission section | flame retardant (A) PC resin | 100 | 100 | 100 | 100 | 100 | 100 | 100 | 100 | 100 | 100 | 100 |
| | (C) silicon light-diffusing agents | 1.0 | 1.0 | 1.0 | 1.0 | 1.0 | 1.0 | 1.0 | 1.0 | 1.0 | 1.0 | 1.0 |
| flame resistance of heat conductive resin composition (flammability: UL94) | | V0 | V0 | V0 | V0 | V0 | V0 | Fail | V0 | V0 | Fail | Fail |
| heat conductivity of heat conductive resin composition (W/mK) | vertical direction | 0.4 | 0.45 | 0.53 | 0.61 | 0.65 | 0.92 | 0.31 | 0.32 | 0.37 | 0.41 | 0.42 |
| | horizontal direction | 0.57 | 0.59 | 0.66 | 0.79 | 0.81 | 1.02 | 0.41 | 0.53 | 0.59 | 0.52 | 0.51 |
| Adhesive property between heat radiation section and light transmission section (grade of appearance) | | 5.0 | 5.0 | 5.0 | 5.0 | 5.0 | 5.0 | 5.0 | 2.0 | 2.1 | 2.5 | 2.2 |

As shown in Table 1, the heat conductive polycarbonate resin compositions of Examples 1 to 6 exhibit excellent flame resistance, excellent conductivity in the horizontal/vertical direction, and excellent adhesive property between the heat radiation section and the light transmission section. For example, in Example 3, when the base resin of the heat conductive resin composition for the heat radiation section is a polycarbonate resin, the adhesive property between the heat radiation section and light transmission section is excellent compared with polyphenylene sulfide resin of Comparative Example 2, or polyamide resin of Comparative Example 4. Also, Example 3 uses magnesium oxide (minute) particles as heat conductive insulating filler and exhibits excellent flame resistance and conductivity in the horizontal/vertical direction compared with the Comparative Example 1 which uses aluminum oxide.

Many modifications and other embodiments of the invention will come to mind to one skilled in the art to which this invention pertains having the benefit of the teachings presented in the foregoing descriptions. Therefore it is to be understood that the invention is not to be limited to the specific embodiments disclosed and that modifications and other embodiments are intended to be included within the scope of the appended claims.

What is claimed is:

1. A light emitting diode (LED) lamp housing comprising a heat radiation section comprising a heat conductive polycarbonate resin composition; and a light transmission section comprising a transparent polycarbonate resin composition,
wherein the heat conductive polycarbonate resin composition comprises (A) about 30 to about 80% by weight of a polycarbonate resin; and (B) about 20 to about 70% by weight of magnesium oxide particles, wherein the magnesium oxide particles (B) include spherical particles having an average diameter of about 30 to about 80 μm, and
wherein the transparent polycarbonate resin composition comprises (A) about 100 parts by weight of a polycarbonate resin; and (C) about 0.1 to about 2 parts by weight of a light-diffusing agent.

2. The LED lamp housing of claim 1, wherein the heat radiation section and the light transmission section are molded into an integral form.

3. The LED lamp housing of claim 1, wherein the heat radiation section and the light transmission section are formed by co-extruding the heat conductive polycarbonate resin composition and the transparent polycarbonate resin composition.

4. The LED lamp housing of claim 1, wherein the LED lamp housing is tubular.

5. The LED lamp housing of claim 1, wherein the heat conductive polycarbonate resin composition and the transparent polycarbonate resin composition each further comprise a flame retardant (D).

6. The LED lamp housing of claim 5, wherein the flame retardant (D) comprises fluorinated polyolefin resin, sulfonic acid metal salt compound, or a combination thereof.

7. The LED lamp housing of claim 1, wherein the heat radiation section has a heat conductivity of about 0.5 W/mK or more in an horizontal direction with respect to the molding direction and a heat conductivity of about 0.4 W/mK or more in a vertical direction with respect to a molding direction, each measured in accordance with ASTM E1461.

8. The LED lamp housing of claim 1, wherein the light-diffusing agent (C) comprises acrylic light-diffusing agent (C1), silicon light-diffusing agent (C2), or a combination of thereof.

9. The LED lamp housing of claim 8, wherein the silicon light-diffusing agent (C2) comprises about 50 to about 100% by weight of polyorgano silsesquioxane based on the total weight of the silicon light-diffusing agent.

10. A method for preparing a light emitting diode (LED) lamp housing comprising:
directing a heat conductive polycarbonate resin composition into a first inlet port of a co-extruder comprising a first extruder including the first inlet port and a second extruder including a second inlet port, wherein the heat conductive polycarbonate resin composition comprises (A) about 30 to about 80% by weight of a polycarbonate resin; and (B) about 20 to about 70% by weight of magnesium oxide particles, wherein the magnesium oxide particles (B) include spherical particles having an average diameter of about 30 to about 80 μm;

directing a transparent polycarbonate resin composition into the second inlet port wherein the transparent polycarbonate resin composition comprises (A) about 100 parts by weight of a polycarbonate resin; and (C) about 0.1 to about 2 parts by weight of a light-diffusing agent;

melting/mixing the heat conductive polycarbonate resin composition and transparent polycarbonate resin composition in the heated first extruder and the heated second extruder, respectively;

directing the melted/mixed heat conductive polycarbonate resin composition from the first extruder into a side of a die having a heat radiation section form and directing the melted/mixed transparent polycarbonate resin composition from the second extruder into another side of the die having a light transmission section form; and molding the heat conductive polycarbonate resin composition and the transparent polycarbonate resin composition into an integral form within the die by adhering the heat radiation section and the light transmission section to one another.

\* \* \* \* \*